No. 692,066. Patented Jan. 28, 1902.
C. J. NORDIN.
MILK CAN.
(Application filed Oct. 14, 1901.)
(No Model.) 3 Sheets—Sheet 1.

No. 692,066. Patented Jan. 28, 1902.
C. J. NORDIN.
MILK CAN.
(Application filed Oct. 14, 1901.)

(No Model.) 3 Sheets—Sheet 2.

Witnesses

Inventor
C. J. Nordin
By H. B. Willson & Co.
Attorneys

No. 692,066. Patented Jan. 28, 1902.
C. J. NORDIN.
MILK CAN.
(Application filed Oct. 14, 1901.)
(No Model.) 3 Sheets—Sheet 3.
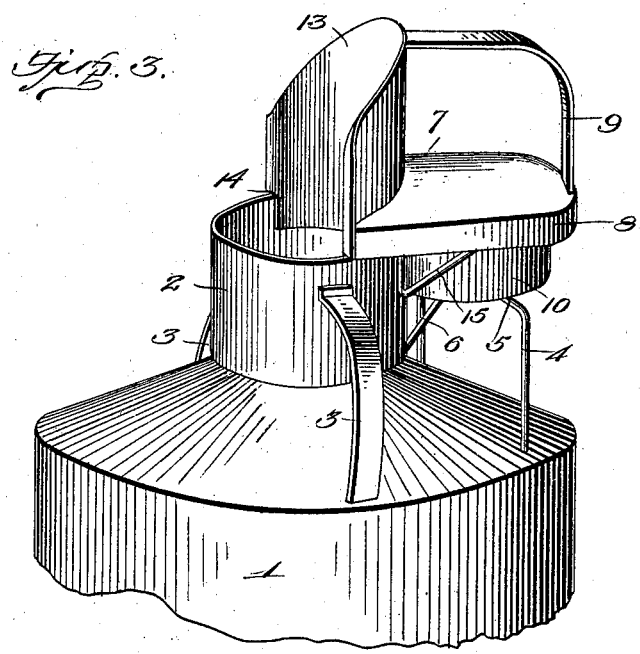
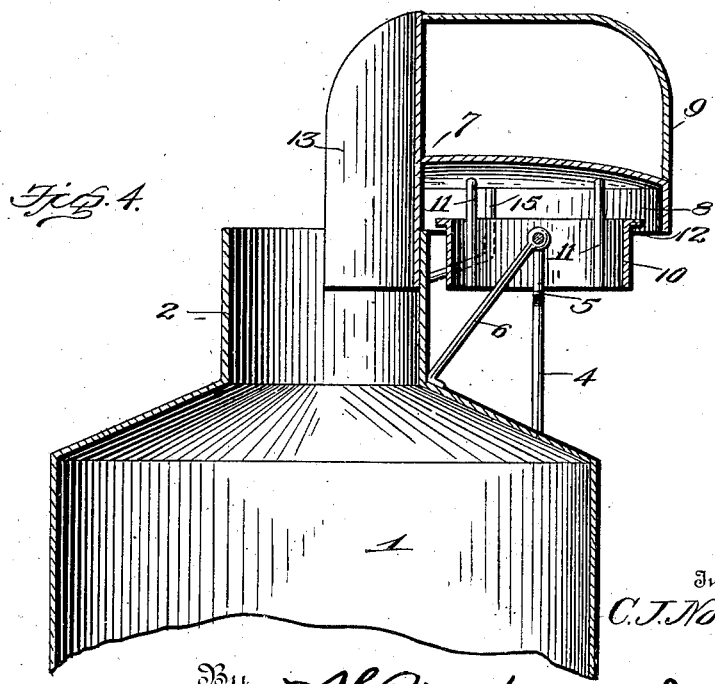
Inventor
C. J. Nordin
Witnesses
By H. B. Willson & Co.
Attorneys

UNITED STATES PATENT OFFICE.

CHARLES J. NORDIN, OF RICE LAKE, WISCONSIN.

MILK-CAN.

SPECIFICATION forming part of Letters Patent No. 692,066, dated January 28, 1902.

Application filed October 14, 1901. Serial No. 78,617. (No model.)

*To all whom it may concern:*

Be it known that I, CHARLES J. NORDIN, a citizen of the United States, residing at Rice Lake, in the county of Barron and State of Wisconsin, have invented certain new and useful Improvements in Milk-Cans; and I do declare the following to be a full, clear, and exact description of the invention, such as will enable others skilled in the art to which it appertains to make and use the same.

The invention relates to a milk-can.

The object of the invention is to provide a milk-can which shall be simple of construction, durable is use, comparatively inexpensive of production, and by means of which the milk as it comes from the cow will be prevented from being contaminated by any foreign matter dropping from the udder into the can, or, during rainy weather, by rain draining from the body of the cow onto the udder and dripping into the can, thereby rendering it wholly unnecessary to strain the milk before consumption.

With these and other objects in view the invention consists of certain novel features of construction, combination, and arrangement of parts, which will be hereinafter more fully described, and particularly pointed out in the appended claims.

Figure 1:
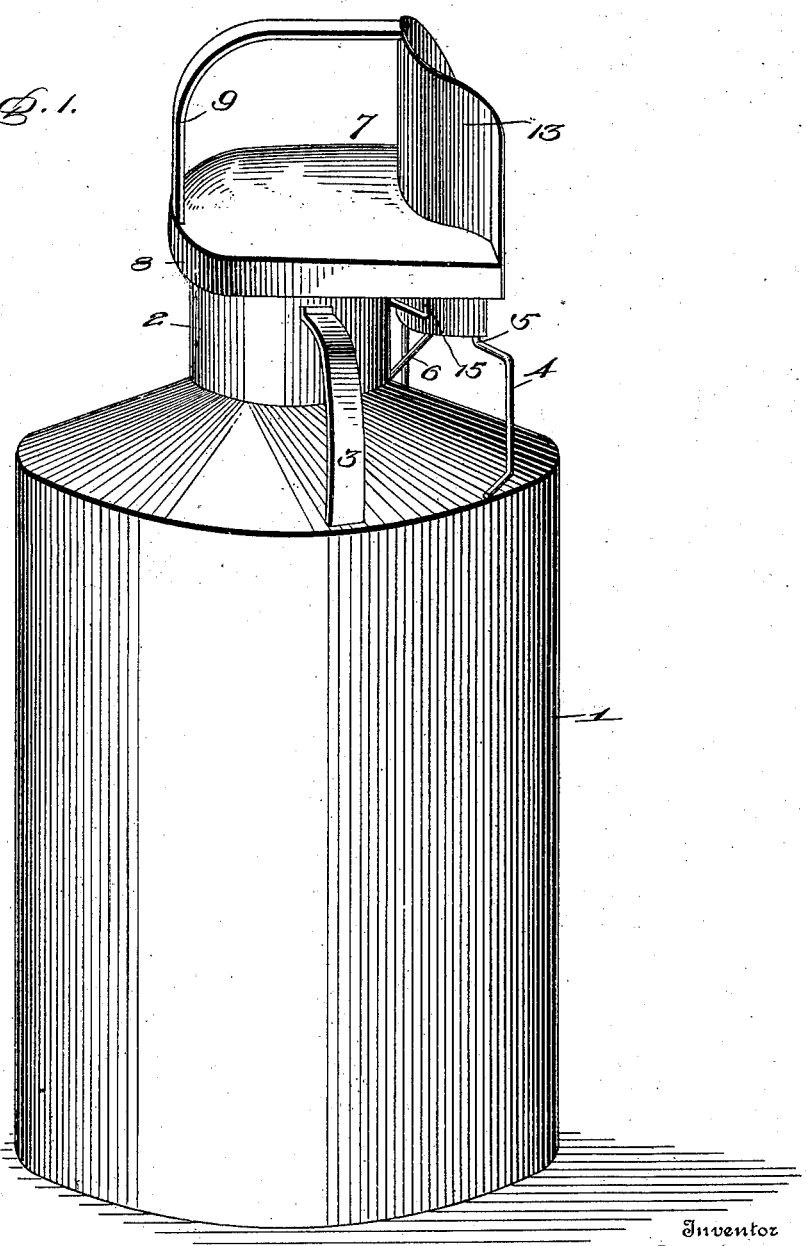
Figure 2:
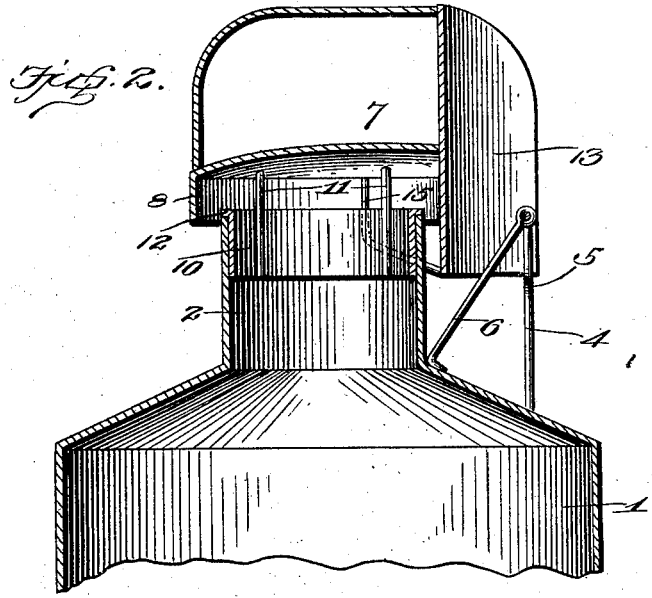
Figure 5:
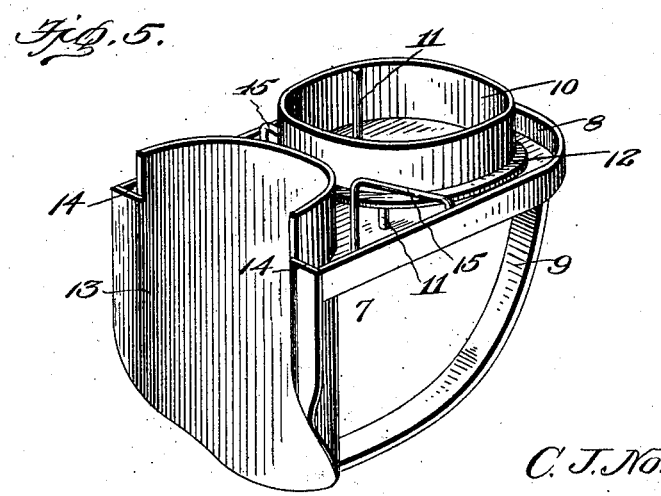

In the accompanying drawings, Figure 1 is a perspective view of the milk-can with its cover in position thereon to ventilate and aerate the milk when the same is in the can. Fig. 2 is a longitudinal vertical sectional view of the parts in the position shown in Fig. 1. Fig. 3 is a detail perspective view showing the position of the cover when the can is used in milking. Fig. 4 is a longitudinal sectional view through the can when the parts are in the position shown in Fig. 3. Fig. 5 is a bottom perspective view of the can top or cover.

Referring to the drawings, 1 denotes the body of the can, 2 the neck thereof, and 3 the handles. Secured to the top of the can at one side of the neck thereof is a support 4, having stop-shoulders 5 and a brace 6. This support is preferably made of a piece of iron, shaped as shown. 7 denotes the cover, provided with a marginal flange 8 and a handle 9. Projecting downwardly from the cover is an annular collar 10, which is spaced from and secured to the under side of the cover by rods 11. This collar fits snugly within the neck of the milk-can when the parts are in the position shown in Figs. 1 and 2, and the space between the upper edge of said collar and the cover affords means for ventilating or aerating the milk, while the marginal flange of the cover prevents foreign matter from falling into the can. The upper end of the collar, if desired, may be formed with a bead or laterally-projecting flange 12 to limit the depth of insertion of the collar within the neck of the milk-can.

13 denotes a shield which is semicircular in cross-section and secured to the laterally-projecting end of the cover and projects above and below the cover and is provided with stop-shoulders 14. The lower end of the shield is shaped to fit snugly within the neck of the can, and the stop-shoulders, when the cover is in the position shown in Figs. 3 and 4 of the drawings, are adapted to abut against the end of the neck of the can and limit the depth of insertion of the shield within the neck, while when in the position shown in Figs. 1 and 2 the lower end of the shield abuts against the stop-shoulders of the support 4, and thus more securely retains the cover in position.

To prevent a vertical rocking or shifting movement of the cover when in the position shown in Figs. 3 and 4, I provide the brace-rods 15, which are secured to the under sides of the cover and engage the outer surface of the neck of the can.

When the can is used for milking purposes, the cover is arranged as shown in Figs. 3 and 4 of the drawings, and the can tilted slightly forwardly, so that as the milk enters the can, in the act of milking, any foreign matter which may be loosened from the udder and which heretofore has invariably dropped into the can will be caught by the shield and fall off to one side, it being observed that the shield at its edges is provided with deflected wings, which extend outwardly at the opposite sides of the neck of the can. In rainy weather, when cows are milked in the open, the rain which drains from the back and sides of the cow down onto the udder heretofore has dripped into the milk-pail; but by the employment of my improved top or cover this objectionable feature is entirely obviated. Thus have I produced a milk-can by the employment of which the tedious task of straining the milk is obviated and at the same time the milk may be retained in the can and allowed to aerate or cool off instead of being emptied from the old form of milk-pails into specially-constructed strainers and coolers.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A reversible milk-can cover, having a shield at one end and a collar at the other, adapted to be interchangeably engaged with the milk-can top, said collar having a space formed between it and the cover to permit of the aeration of the milk, substantially as set forth.

2. The combination with a milk-can having a neck portion and provided with a support having stop-shoulders, of a cover provided with a collar adapted to fit within the neck and also to fit over said support and rest upon said shoulders, and a shield secured to said cover at the opposite end thereof and adapted to fit within said neck and also to fit around said support and engage the stop-shoulders thereof, substantially as set forth.

3. The combination with a milk-can having a neck portion and provided with a support having stop-shoulders, of a cover provided with a collar adapted to fit within the neck and also to fit over said support and rest upon said shoulders, said collar being spaced from said cover to provide means for ventilating or aerating the milk, and a shield secured to said cover at the opposite end thereof and adapted to fit within said neck and also to fit around said support and engage the stop-shoulders thereof, substantially as set forth.

In testimony whereof I have hereunto set my hand in presence of two subscribing witnesses.

CHARLES J. NORDIN.

Witnesses:
SEWELL A. PETERSON,
ERNEST R. BOLL.